(12) United States Patent
Troyen

(10) Patent No.: US 6,774,308 B1
(45) Date of Patent: Aug. 10, 2004

(54) WIRE TERMINATION BOX ASSEMBLY AND ASSOCIATED METHOD OF INSTALLATION

(76) Inventor: Steven Troyen, 6025 Ward La., Levittown, PA (US) 19057

( * ) Notice: Subject to any disclaimer, the term of this patent is extended or adjusted under 35 U.S.C. 154(b) by 0 days.

(21) Appl. No.: 10/389,579

(22) Filed: Mar. 17, 2003

(51) Int. Cl.$^7$ .............................................. H02G 13/00
(52) U.S. Cl. ............................ 174/63; 174/53; 174/96; 174/50; 174/48; 174/58; 174/72 R; 174/49; 174/88 R; 174/95; 174/101; 220/3.3; 220/2.1; 220/3.4; 220/3.5; 220/3.6; 220/3.7; 220/3.8; 220/476; 52/220.1; 138/115; 138/117; 138/157
(58) Field of Search .............................. 174/53, 50, 48, 174/58, 63, 72 R, 49, 88 R, 95, 96, 101; 220/3.3, 2.1, 3.4, 3.5, 3.6, 3.7, 3.8, 476, 3.2; 52/220.1; 138/115, 117, 157

(56) References Cited

U.S. PATENT DOCUMENTS

| | | | | |
|---|---|---|---|---|
| 3,573,344 A | * | 4/1971 | Snyder | ........................ 174/57 |
| 3,716,651 A | * | 2/1973 | Werner | ........................ 174/53 |
| RE34,332 E | * | 8/1993 | Adams et al. | ........... 285/123.2 |
| 5,269,695 A | * | 12/1993 | Opel | ........................... 439/107 |
| 5,445,539 A | * | 8/1995 | Dale | .......................... 439/535 |

* cited by examiner

*Primary Examiner*—Dean A. Reichard
*Assistant Examiner*—Anton Harris
(74) *Attorney, Agent, or Firm*—LaMorte & Associates

(57) ABSTRACT

A system, device and method are claimed for installing electrical switches and electrical plug connectors in a wall, without the use of junction boxes. The system uses prefabricated switch assemblies and/or receptacle assemblies. These assemblies contain either a switch or a receptacle that is manufactured into a housing. On the rear of the housing are one or two protrusions. Wire connector ports are disposed within the areas defined by the protrusions. The wire connector ports are coupled to either the switch or receptacle within the housing. To install an assembly, at least one hole is drilled into a wall and a cable run through the hole. The wires from the cable are stripped and inserted into the wire connector ports within the protrusion on the rear of the assembly. The protrusion is then inserted into the hole in the wall and the assembly is mounted flush on the face of the wall.

15 Claims, 5 Drawing Sheets

WIRE TERMINATION BOX ASSEMBLY AND ASSOCIATED METHOD OF INSTALLATION

BACKGROUND OF THE INVENTION

1. Field of the Invention

The present invention relates to wire termination boxes of the type use to house plugs and switches in a traditional 120-volt wiring system. More particularly, the present invention relates to the structure of the wire termination boxes and the method in which the wire termination boxes are installed.

2. Description of the Prior Art

In modern construction, electrical receptacles and switches are traditionally placed within junction boxes. The junction boxes are recessed in the wall and are typically made of metal or a fire resistant formulation of a poly-vinyl chloride (PVC). Traditional junction boxes have access ports that enable wires to enter and exit the interior of the junction box at a variety of locations. Wires are led into the junction box from various electrical cables. Within the junction box, the wires are connected to some electrical component, such as a receptacle, switch or the like. The front of the junction box is then covered with a plate, thereby isolating the interior of the junction box.

The purpose of the junction box is to isolate the connection between the wires and the electrical component placed in the box. In this manner, if the connection were ever to come loose or otherwise fail, any sparks produced would be contained within the junction box. This greatly reduces the risk of fire occurring within a wall.

Although the use of traditional junction boxes greatly increases safety, it also greatly increases labor costs during installation. In new construction, an electrician sets the junction boxes in the walls. The workers who place wall coverings on the walls must then cut holes in the wall coverings that correspond to the position and size of the junction boxes. With gypsum board, the cutting of the holes for the junction boxes is fairly simple. However, with wall coverings, such as tile, stone, brick, marble or the like, the cutting of the holes for the junction boxes is a highly labor intensive and expensive task.

The time involved in placing a traditional box in an existing wall is even more labor intensive. First, a proper position in a wall must be determined. That position cannot be directly atop a framing stud, pipe or other interior wall obstacle. A rough opening must then be cut through the existing wall covering. The rough opening must match the dimensions of the junction box being installed. As such, the rough opening created in the wall is typically rectangular, since most junction boxes are rectangular. Wires must then be advanced to the position of the rough opening and the junction box installed into the rough opening. The junction box must then be secured to the wall. At this point, a receptacle or switch can be connected to the wires within the junction box in the traditional manner.

In an attempt to reduce the amount of time, and thus cost, that it takes an electrician to install a receptacle or a switch, new junction box designs have been developed. Such prior art designs are exemplified by U.S. Pat. No. 3,716,651 to Werner, entitled Minimum Wire Box And Device Adapters and U.S. Pat. No. 5,269,695 to Opel, entitled Electrical Outlet and Plug therefore. Such prior art systems simplify the installation of a receptacle or switch to wires within the junction box. However, these prior art devices do not simplify the process of installing a junction box into a wall.

Consequently, a need therefore exists for an improved system that reduces the time and costs associated with installing receptacles and switches. This need is met by the present invention as described and claimed below.

SUMMARY OF THE INVENTION

The present invention is a system, device and method for installing electrical switches and electrical plug connectors in a wall, without the use of junction boxes. The system uses prefabricated switch assemblies and/or receptacle assemblies. These assemblies contain either a switch or a receptacle that is manufactured into a housing. On the rear of the housing are one or two protrusions. Wire connector ports are disposed within the ends of the protrusions. The wire connector ports are coupled to either the switch or receptacle within the housing.

To install a switch assembly, a hole is drilled into a wall and a cable run through the hole. The wires from the cable are stripped and inserted into the wire connector ports within the protrusion on the rear of the assembly. The protrusion is then inserted into the hole in the wall and the assembly is mounted flush on the face of the wall.

To install the receptacle connector, two holes are drilled in the wall and cable run through the holes. The wires from the cables are stripped and inserted into the wire connector ports within the two protrusions on the rear of the assembly. The protrusions are then inserted into the holes in the wall and the assembly is mounted flush on the face of the wall.

As such, only small holes need to be drilled into the wall behind each of the assemblies. The housing of the assemblies acts as its own junction box. As a result, new junction boxes need not be installed. Since junction boxes do not need to be installed into the walls, the installation procedure is greatly simplified.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention assembly can be used to terminate electrical wires with any type of electrical component, such as a light fixture, a ceiling fan base, a dimming switch or the like, the present invention assembly is especially well suited for terminating wires with either a receptacle or a single pole switch. Accordingly, in order to present the best mode contemplated for the present invention device, the assembly will be described using a receptacle and a single pole switch.

Figure 1:
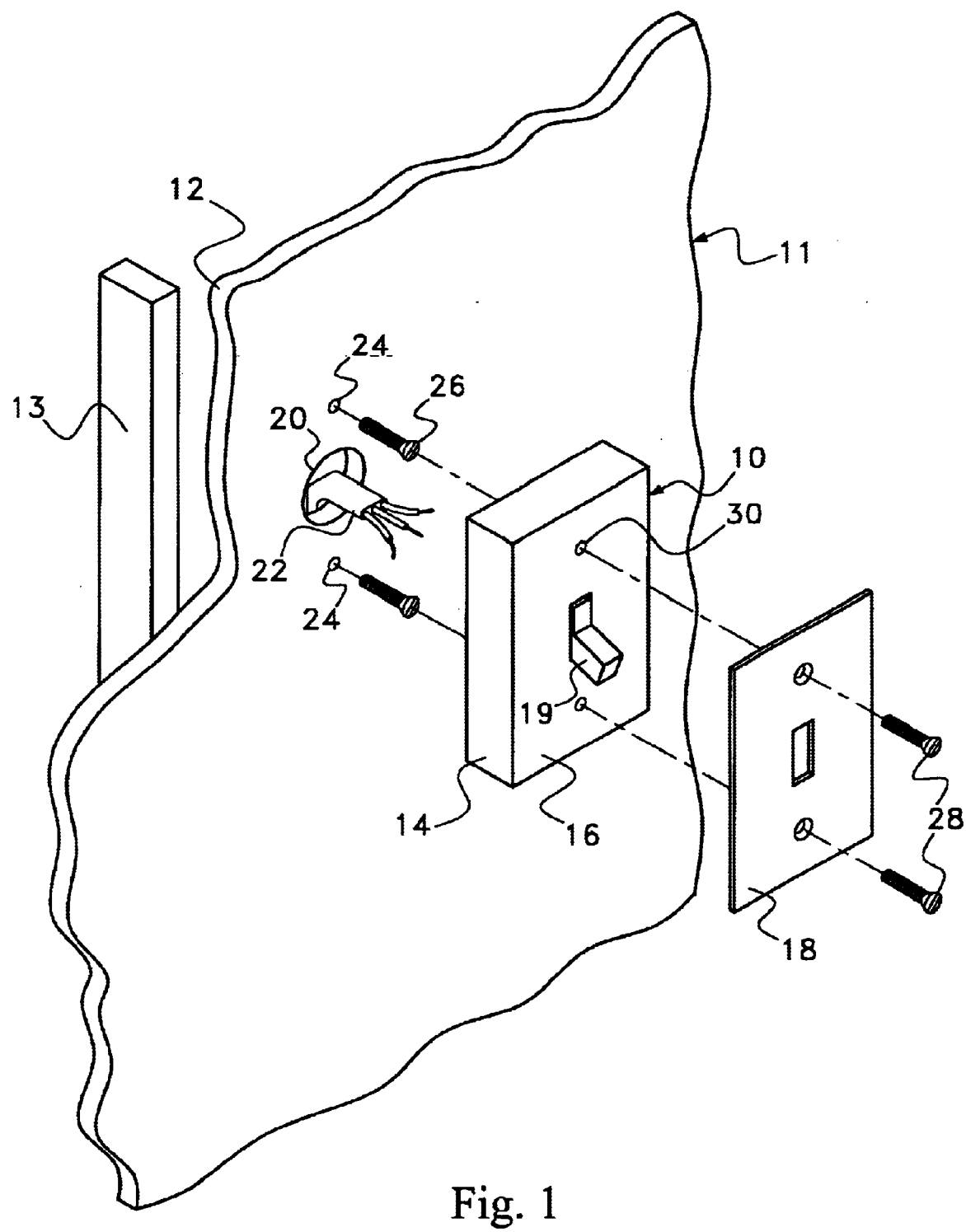
FIG. 1 is a perspective view of a switch assembly in accordance with the present invention.

Referring to FIG. 1, there is shown a wall 11, of a common construction. The wall 11 contains wall covering material 12 supported by framing studs 13. The wall covering material 12 can be gypsum board, plaster, tile, brick, marble, paneling or any combination thereof. Also shown in FIG. 1, is an exemplary embodiment of a switch assembly 10 in accordance with the present invention.

The switch assembly 10 is a complete manufactured unit. As such, it requires no assembly. The switch assembly 10 includes a housing 14 that mounts flush onto the face of the wall 11. The front of the housing 14 is covered by a faceplate 16 that is integrally formed as part of the housing 14. The housing 14 and faceplate 16 can be molded in a variety of different colors and shapes to match the diversified desires of the consuming public.

The faceplate 16 on the housing 14 is preferably slightly smaller than a traditional switch cover plate. In this manner, a person can optionally attach a traditional switch cover plate 18 over the faceplate 16. The traditional faceplate 18 will therefore appear to become part of the switch assembly 10. In this manner, a person can customize the look of the switch assembly 10.

Inside the switch assembly 10 is a single pole or double pole switch that is rated for at least 120 volts and thirty amps. The switch is activated by a toggle 19 that protrudes from the faceplate 16, as is traditional with electric switches. The toggle 19 can be replaced with a touch plate, push button or any other design currently used as the physical interface in electrical wall switches.

The housing 14 of the switch assembly 10 acts as its own junction box. Consequently, the switch assembly 10 need not be connected to any existing junction box. Rather, to install the switch assembly 10, a person need only supply electrical wires behind the switch assembly 10 and mount the switch assembly 10 to the wall 11.

To provide electrical wires behind the switch assembly 10, a round hole 20 is drilled in the wall 11 at the point where the switch assembly 10 is to be mounted. The hole 20 is preferably between one half inch and three-quarters of an inch in diameter. A hole 20 of such a diameter can easily be drilled through any wall material, provided the right type of drill bit is used. A hole 20 of such dimensions is also large enough for standard fourteen gauge and twelve gauge wire cables to pass. As such, first a hole 20 is drilled in the wall 11. A length of cable 22 is then extended through the hole 20.

Depending upon the configuration of the wall 11, two smaller mounting holes 24 may also be drilled into the wall 11. For instance, if the wall 11 were tile, marble, or plaster, two small mounting holes 24 would be drilled above and below the wire cable hole 20. Screw fittings would then be placed in the mounting holes 24 so that screws 28 can be threaded into these holes 24.

Screw holes 30 are formed through the housing 14 of the switch assembly 10. The screw holes 30 correspond to the mounting hole locations of a standard prior art switch cover plate 18. Mounting screws 28 are provided. The mounting screws 28 attach the switch assembly 10 to the wall 11 and can also serve to attach a switch cover plate 18 to the switch assembly 10. However, the use of mounting screws 28 is optional. If desired, the switch assembly 10 can be mounted to the wall 11 using double-sided tape or any appropriate adhesive.

Figure 2:
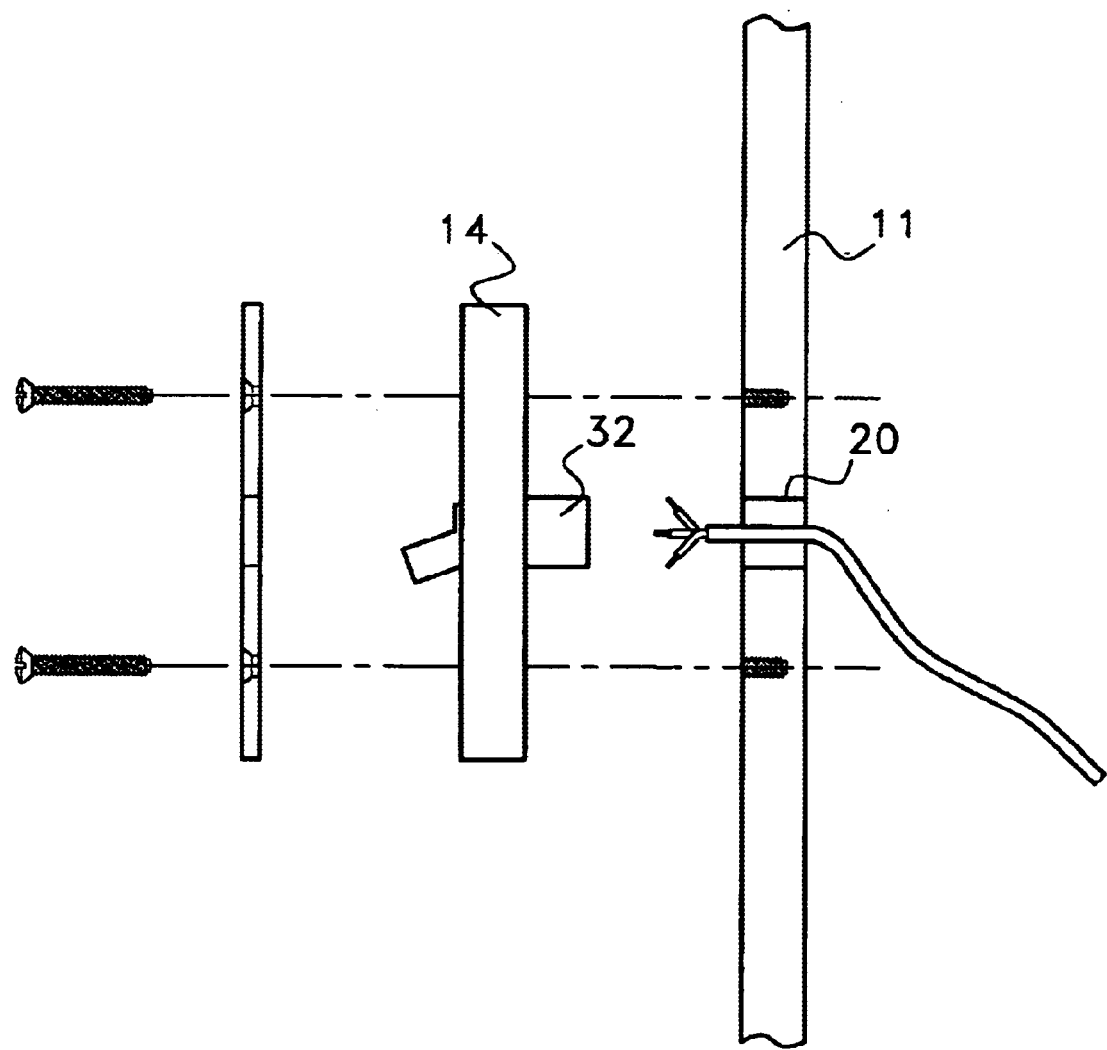
FIG. 2 is a side view of the embodiment of FIG. 1, wherein the wall behind the switch assembly is shown in cross-section.

Referring now to FIG. 2, it can be seen that on the rear surface of the switch housing 14 is a protrusion 32. The shown protrusion 32 is cylindrical. However, any shaped protrusion can be used provided the protrusion passes into the hole 20 that is formed in the wall 11. In the shown embodiment, outside diameter of the cylindrical protrusion 32 is smaller than the diameter of the hole 20 drilled into the wall 11. As a result, when the switch assembly 10 is mounted to the wall 11, the cylindrical protrusion 32 extends into the hole 20 in the wall 11. This allows the rear of the switch housing 14 to lay flush against the wall 11.

Figure 3:
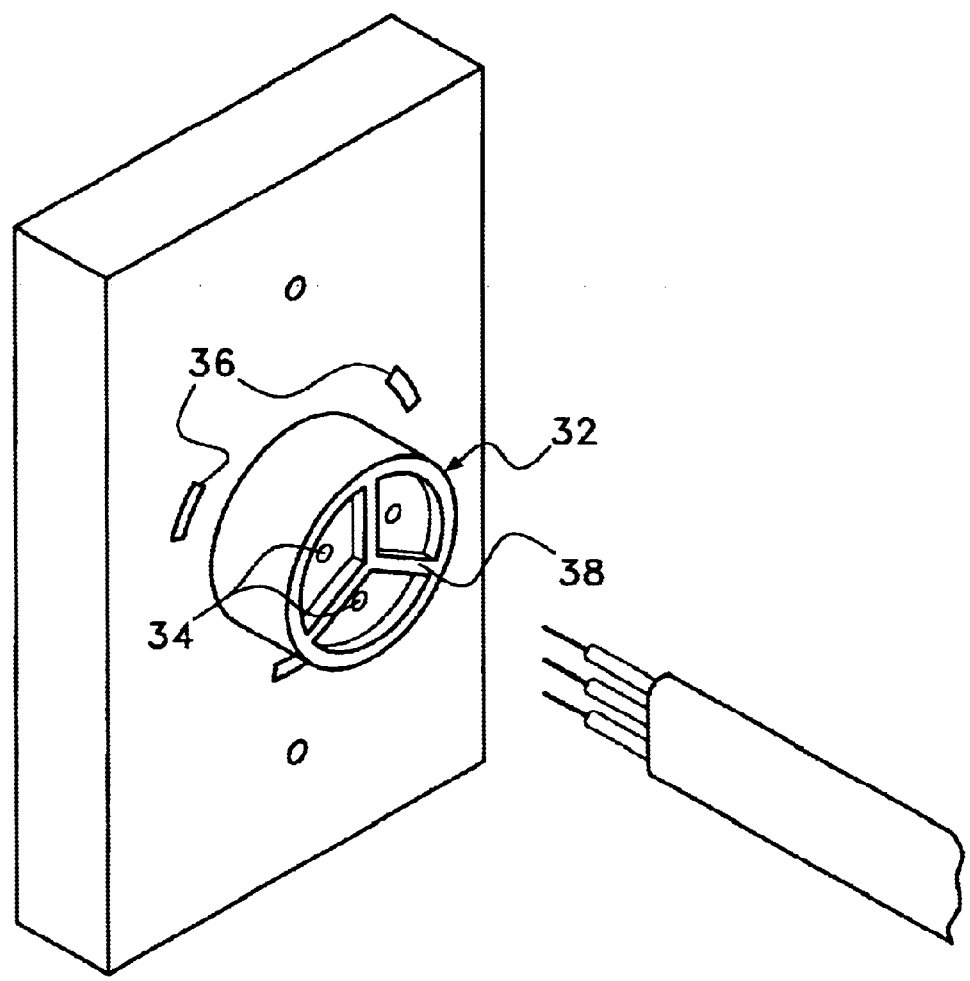
FIG. 3 is a rear perspective view of the switch assembly shown in FIG. 1 and FIG. 2.

Referring to FIG. 3, it can be seen that contained within the protrusion 32 are three wire connector ports 34. Each of the wire connector ports 34 receives a segment of wire that has been stripped of insulation. The use of wire connector ports 34 is commonplace in modern switch and plug connector designs. Any prior art wire connector port configuration can be adapted for use with the present invention. In the shown embodiment, there are three wire connector ports 34 in the protrusion 32. This is to receive the three wires that lead to a single pole switch. If the switch assembly contained a double pole switch, four wire connector ports would be present.

Release slots 36 are positioned on the outside of the protrusion 32 so that a person can selectively remove a wire from a wire connector port 34 after a wire has been inserted into a wire connector port 34. The use of release slots adjacent wire connector ports is commonplace in the prior art.

Inside the tip of the protrusion 32 are divider walls 38. The divider walls 38 can have many different appearances. However, the purpose of the divider walls 38 is to separate the various wire connector ports 34 from one another. In order for an electrician to insert a wire into a wire connector port 34, the electrician first strips the insulation from each of the wires. As an electrician strips the insulation from the wires, the length of the removed insulation may vary slightly from wire to wire. As such, when the bare wires are inserted into the wire connector ports 34, each wire may have a small segment of uninsulated wire exposed in front of the wire connector ports 34. The purpose of the recessed tip of the protrusion 32 and the divider walls 38 is to protect any exposed segment of wire from being inadvertently contacted once within the wall. The recessed tip of the protrusion 32 and the divider walls 38 also prevent sparks from occurring between exposed areas of wire and objects surrounding the protrusion 32 in the wall.

The mounting of the switch assembly 11 flush to a wall is only one way in which it can be installed. It will be understood that switch assembly 10 can also be retroactively added into the junction box opening of a traditional switch. To do so, the traditional switch is removed so that the open junction box is exposed. The housing 14 of present invention switch assembly can then be inserted into the open junction box with a friction fit. Alternatively, adhesive can be applied to the back surface of the cover plate 18 near its peripheral edge. The switch assembly 10 is inserted into the open junction box and the cover plate 18 is adhesively attached to the wall 11.

Figure 4:
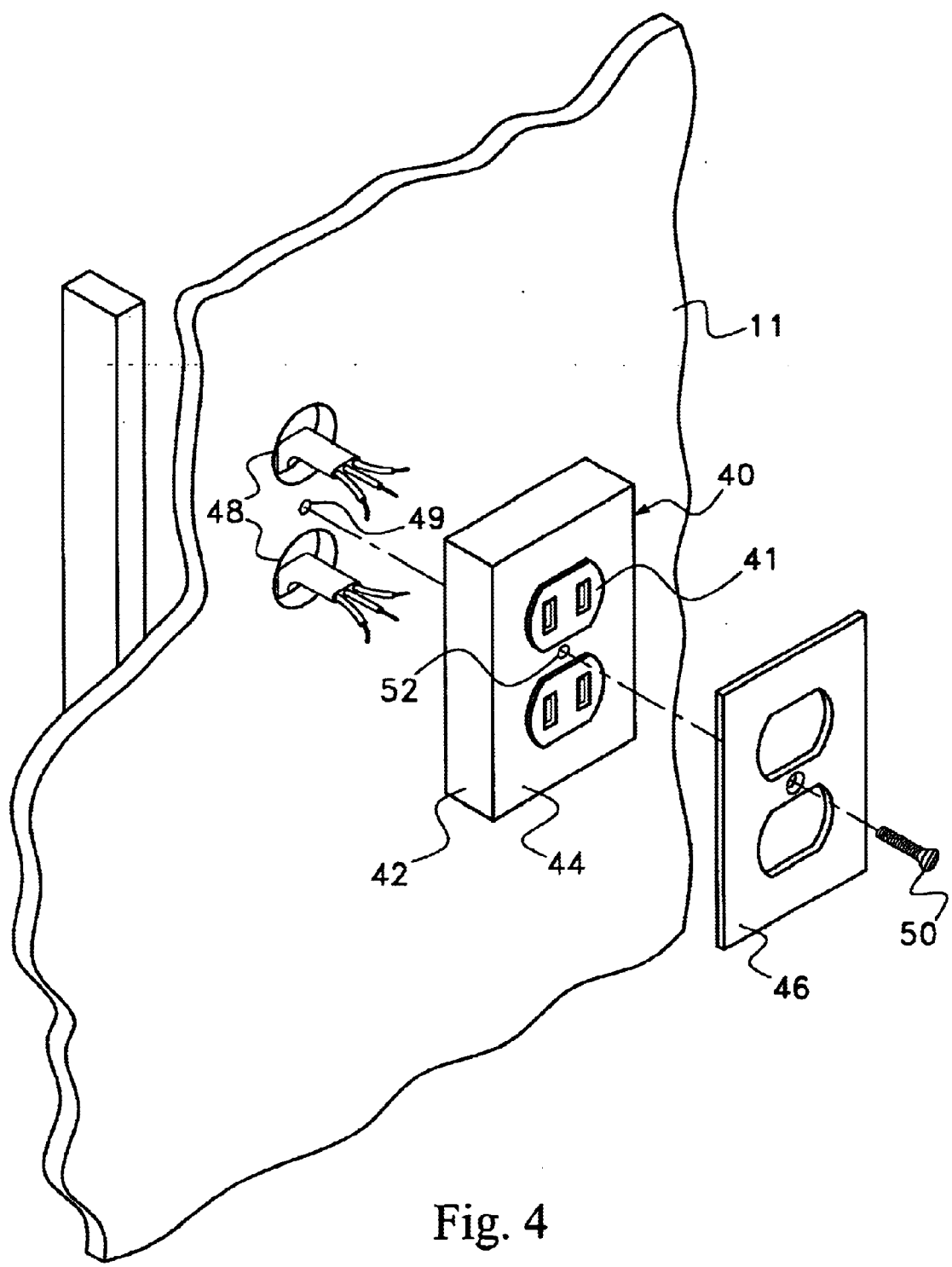
FIG. 4 is a perspective view of a receptacle assembly in accordance with the present invention.

Referring to FIG. 4, a receptacle assembly 40 is shown in accordance with the present invention. The receptacle assembly 40 contains a receptacle 41 sealed within a housing 42. The receptacle assembly 40 is a premanufactured unit that requires no assembly by an electrician. The housing 42 of the receptacle assembly 40 has an integral faceplate 44. However, an optional cover plate 46 can be attached to the receptacle assembly 40 if desired.

Often receptacles are installed in series. As such, each receptacle is coupled to an incoming electrical cable and an outgoing electrical cable. Since two cables may lead to the receptacle assembly 40, two holes 48 are drilled in the wall 11 behind the receptacle assembly 40. Each hole 48 is preferably between one half inch and three-quarters of an inch in diameter. Holes of such diameters can easily be drilled through any wall material, provided the right type of drill bit is used. Holes of such dimensions are large enough for standard fourteen gauge and twelve gauge wire cables to pass.

Depending upon the configuration of the wall 11, a smaller mounting hole 49 may also be drilled into the wall 11. For instance, if the wall is tile, marble, brick or plaster, a small mounting hole 49 may be drilled between the wire cable holes 48. A screw fitting would then be placed in the mounting hole so that a mounting screw 50 can be threaded into the hole 49.

A screw hole 52 is formed through the housing 42 of the receptacle assembly 40. The hole 52 corresponds to the mounting hole location of a standard prior art outlet cover plate 46. A mounting screw 50 is provided. The mounting screw 50 attaches the receptacle assembly 40 to the wall 11 and can also serve to attach an outlet cover plate 46 to the receptacle assembly 40. However, the use of a mounting screw 50 is optional. If desired, the receptacle assembly 40 can be mounted to the wall 11 using double sided tape or any appropriate adhesive.

Figure 5:
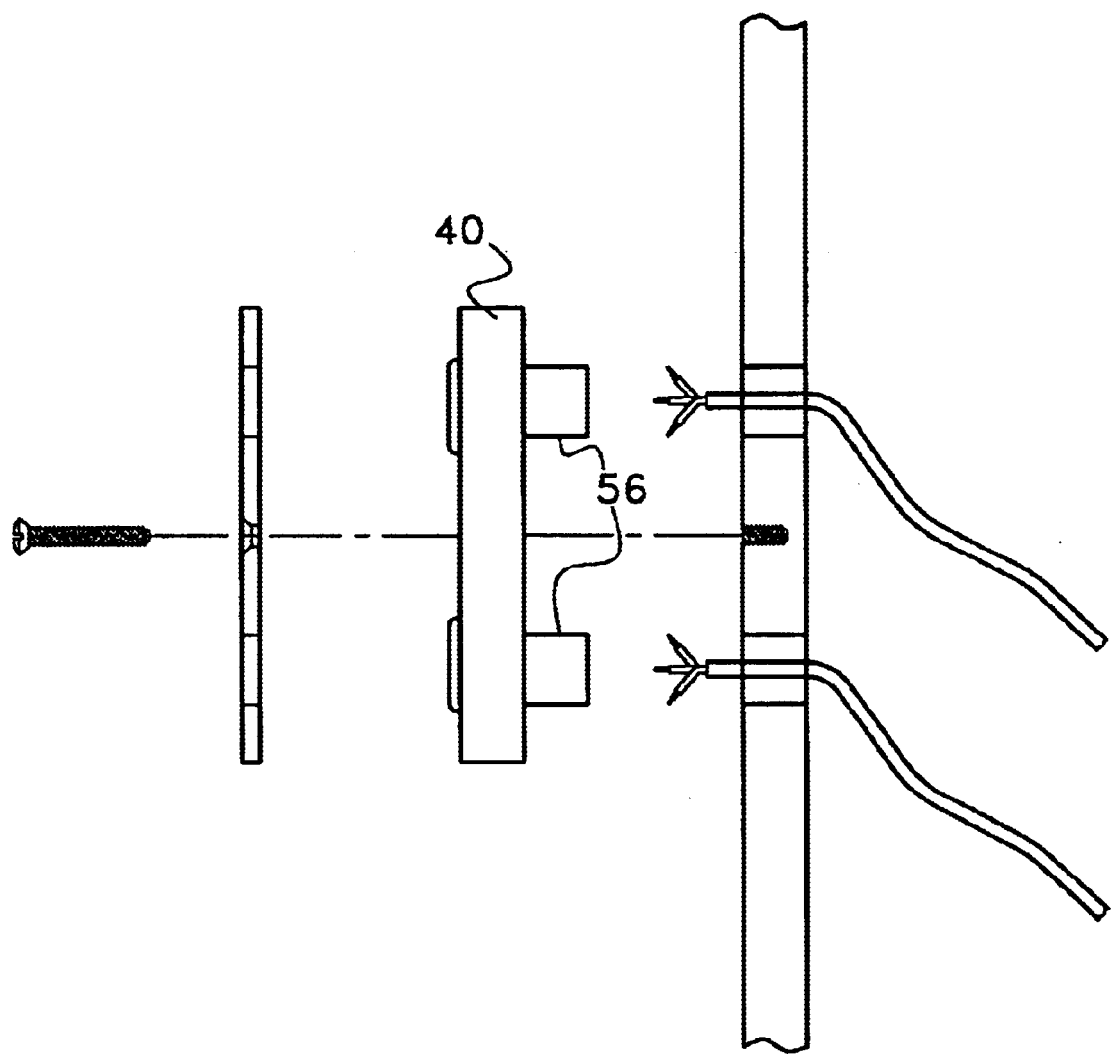
FIG. 5 is a side view of the embodiment of FIG. 4, wherein the wall behind the receptacle assembly is shown in cross-section.

Referring to FIG. 5, it can be seen that on the back of the receptacle assembly 40 is located two protrusions 56. Each of the protrusions 56 surrounds a set of wire connector ports. The protrusions 56 protect the wire connections with the wire connector ports in the same manner as has previously been explained with reference to FIG. 3. It will also be understood that the receptacle assembly can be added to a open junction box of a traditional receptacle in the same manner as was described for the switch assembly in FIG. 3.

In view of the above descriptions, it can be seen that either a switch or a receptacle can be installed on a wall without first having to place a junction box in the wall. Accordingly, by using the present invention system, outlets and switches can be added to existing walls in a fraction of the time previously needed.

It will be understood that the embodiments of the present invention illustrated and described are merely exemplary and that a person skilled in the art can make many modifications to the described embodiments. For instance there are many different types of electrical switches and receptacles in existence. The structure of any such switch or receptacle can be adapted for use in the present invention. The way the switch or receptacle internally functions is not of importance. Rather, it is the placement of a switch or a receptacle in a premanufactured assembly that can be mounted to a wall without a junction box that is at the center of the present invention. As such, the type and appearance of the switch or receptacle can be varied as desired. All such modifications, alterations and alternate embodiments are intended to be included within the scope of this invention as defined by the claims listed below.

What is claimed is:

1. A method of installing an electrical switch on a face surface of a wall, comprising the steps of:

drilling at least one hole of a first diameter through a face surface of a wall;

extending an electrical cable through said at least one hole, wherein said electrical cable contains wires;

providing an assembly containing an electrical switch disposed in a housing, said housing having a rear surface and at least one projection extending from said rear surface, wherein wire connector ports are disposed in said at least one protrusion, and wherein said wire connector ports are coupled to said switch within said housing;

connecting said wires from said electrical cable to said wire connector ports; and mounting said assembly to said face surface of said wall over said at least one hole, wherein said at least one protrusion passes into said at least one hole and said rear surface of said housing and lay flush against said surface of said wall.

2. The method according to claim 1, wherein said step of mounting said assembly to said face surface of said wall includes extending mechanical fasteners through said assembly into said wall.

3. The method according to claim 1, wherein said step of mounting said assembly to said face surface of said wall includes adhesively attaching said rear surface of said housing to said wall.

4. The method according to claim 1, further including the step of mounting a cover plate over said assembly.

5. The method according to claim 4, wherein said step of mounting said assembly to said wall includes attaching said cover plate to said wall.

6. The method according to claim 1, wherein said first diameter is between ⅜ of an inch and 1¼ inches.

7. The method according to claim 6, wherein said at least one protrusion is cylindrical and has a diameter that enables said at least one protrusion to pass into said at least one hole.

8. The method according to claim 1, wherein said step of drilling at least one hole of a first diameter through a face surface of a wall, includes drilling a single hole having a diameter of less than 1¼ inches.

9. A method of installing a receptacle on a face surface of a wall, comprising the steps of:

drilling two holes of a first diameter through a face surface of a wall;

extending wires through each of said holes;

providing a receptacle assembly containing a receptacle disposed in a housing, said housing having a rear surface and two projections extending from said rear surface, wherein wire connector ports are disposed in each of said protrusions, and wherein said wire connector ports are coupled to said receptacle within said housing;

connecting said wires to said wire connector ports; and mounting said receptacle assembly to said face surface of said wall over said holes, wherein said protrusions pass into said holes and said rear surface of said housing and lay flush against said face surface of said wall.

10. The method according to claim 9, wherein said first diameter is between ⅜ of an inch and 1¼ inches.

11. The method according to claim 10, wherein each of said protrusion is cylindrical said protrusions to pass into said holes.

12. The method according to claim 9, wherein said step of mounting said receptacle assembly to said wall includes extending mechanical fasteners through said receptacle assembly into said wall.

13. The method according to claim 9, wherein said step of mounting said receptacle assembly onto said wall includes adhesively attaching said receptacle assembly to said wall.

14. The method according to claim 9, further including the step of mounting a cover plate over said receptacle assembly.

15. The method according to claim 9, wherein said step of mounting said receptacle assembly to said wall includes extending mechanical fasteners through said cover plate and into said wall.

* * * * *